United States Patent [19]

Smith et al.

[11] 4,081,222
[45] Mar. 28, 1978

[54] COMBINED VACUUM BAFFLE AND VALVE FOR DIFFUSION PUMP

[75] Inventors: Ronald D. Smith, Bovingdon, England; Steven B. Frankel, San Jose, Calif.; John R. Reeher; Michael S. Story, both of Los Gatos, Calif.

[73] Assignee: Finnigan Corporation, Sunnyvale, Calif.

[21] Appl. No.: 664,002

[22] Filed: Mar. 4, 1976

[51] Int. Cl.² .............................. F04F 9/00
[52] U.S. Cl. ................................ 417/153
[58] Field of Search ............. 417/152, 153, 154, 54, 417/55, 51, 87

[56] References Cited
U.S. PATENT DOCUMENTS

| | | | |
|---|---|---|---|
| 3,122,896 | 3/1964 | Hickey | 417/153 X |
| 3,224,665 | 12/1965 | Milleron et al. | 417/153 X |
| 3,649,339 | 3/1972 | Smith | 417/152 |
| 3,697,195 | 10/1972 | Johnson et al. | 417/154 |
| 3,829,244 | 8/1974 | Miller | 417/53 |
| 3,876,337 | 4/1975 | Landfors | 417/152 |

FOREIGN PATENT DOCUMENTS

| | | | |
|---|---|---|---|
| 1,020,152 | 11/1957 | Germany | 417/87 |
| 1,074,208 | 1/1960 | Germany | 417/152 |

*Primary Examiner*—William L. Freeh
*Assistant Examiner*—Edward Look
*Attorney, Agent, or Firm*—Flehr, Hohbach, Test, Albritton & Herbert

[57] ABSTRACT

In a vacuum system a baffle-valve acts first as a baffle to reduce the backstreaming of a diffusion pump fluid into the main vacuum chamber being evacuated and secondly it can be used as a valve to provide complete isolation between the diffusion pump and the vacuum chamber. This enables the chamber to be open for service work while the diffusion pump is kept operating for rapid pump down. The foregoing dual use of the baffle/valve increases pumping efficiency because of higher conductance.

2 Claims, 2 Drawing Figures

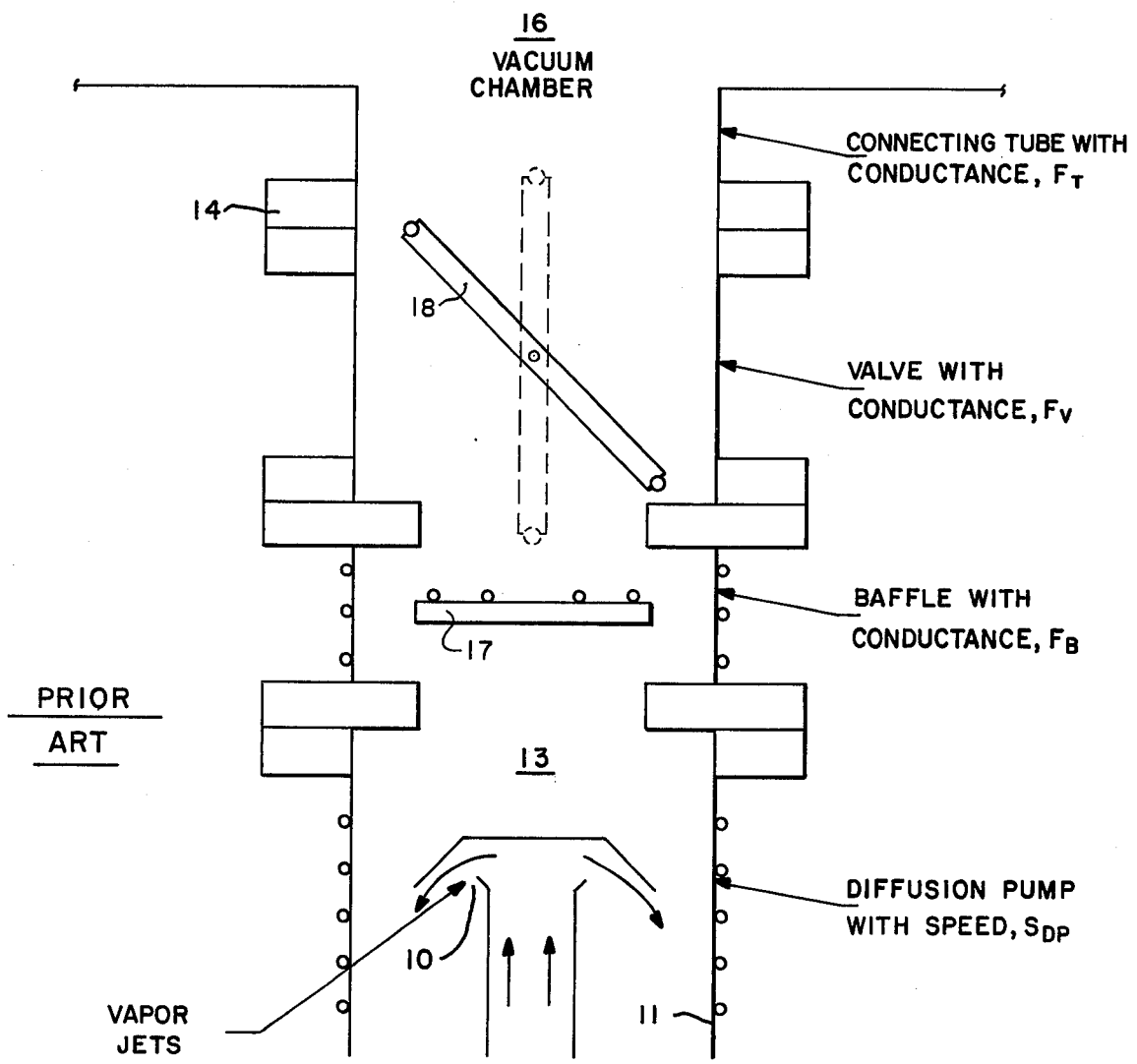
FIG.—1

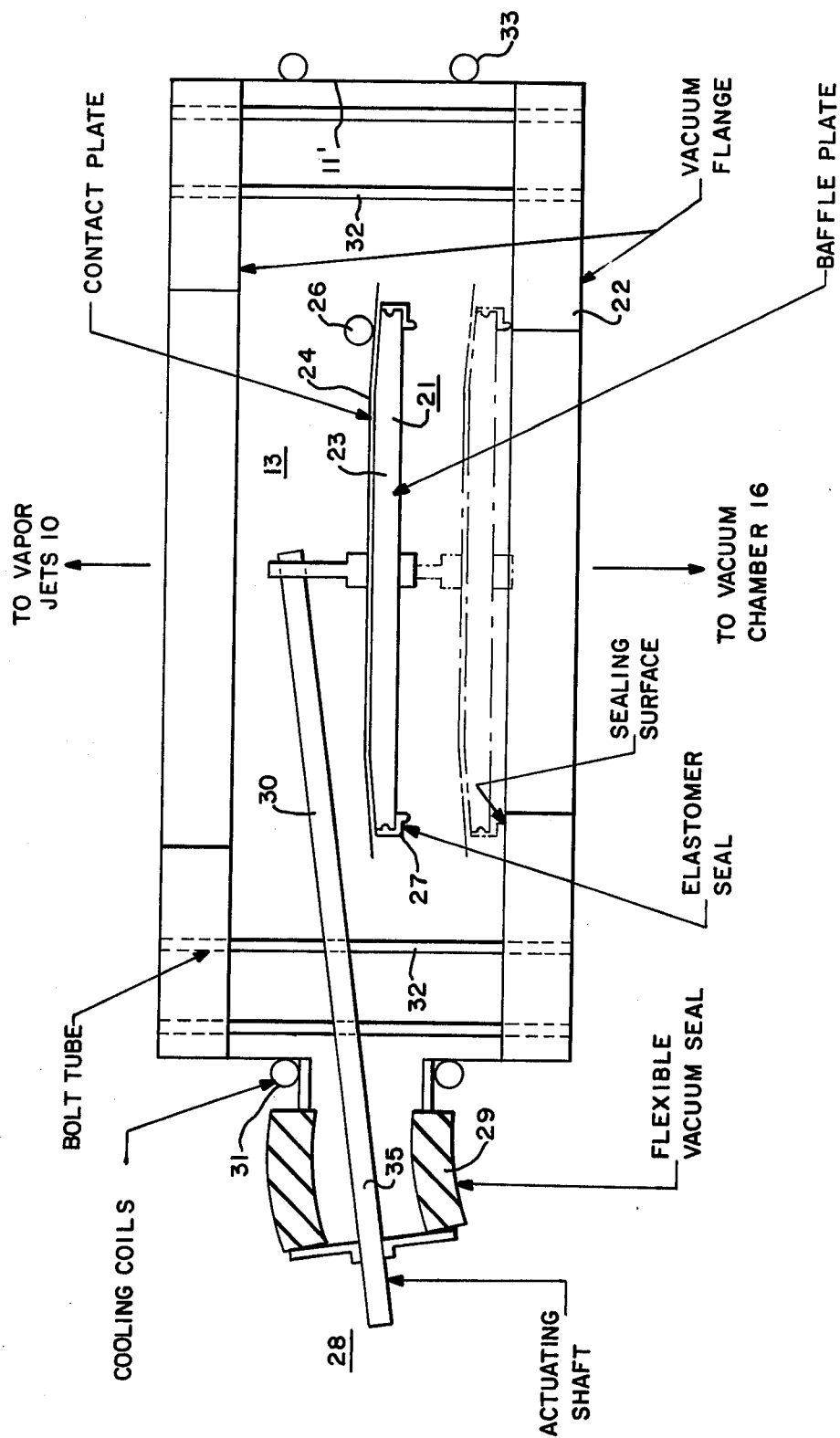
FIG.—2

COMBINED VACUUM BAFFLE AND VALVE FOR DIFFUSION PUMP

BACKGROUND OF THE INVENTION

The present invention is directed to a combined vacuum baffle and valve for a diffusion pump.

FIG. 1 shows a typical prior art diffusion pump. It includes vapor jets 10, only a stage of which is indicated, which may, for example, use oil or mercury vapor diffusing jets to produce the diffusion pumping action. The oil vapor is then condensed on the cold wall 11 of the pump chamber; cooling coils 12 are illustrated. The diffusion pump 13 is connected by flanges 14 to a vacuum chamber 16.

It has been found that diffusion pumps of the present type can be utilized to provide a high vacuum to pressures below $10^{-7}$ torr. This is without the use of cold traps. However, to prevent the transport of the diffusion pump oil or mercury fluid vapors toward the high vacuum chamber 16 it has been found advantageous to use a simple cooled mechanical baffle 17. This prevents the transport of vapor into the vacuum chamber which is known as back-streaming. The center plate 17 provides an optical baffle such that an oil molecule must make a minimum of three bounces from surfaces to pass through the baffle. The surfaces are cooled giving a high probability that the oil molecule will stick to a surface.

Since a diffusion pump removes gas molecules from a vacuum chamber by sweeping down the molecules that come in the path of the oil vapor stream from the vapor jets, minimum impedance should be provided to the gas molecules to minimize the reduction in the effective pumping speed of the diffusion pump. Thus the conductance of baffle 17 should be a maximized.

Since a vacuum often provides a favorable environment for an experiment, frequent access is required to the equipment inside the chamber to make changes; such as, for example, removing finished and loading new components or for general servicing. Before the chamber can be exposed to atmospheric pressure the diffusion pump power must be turned off and the working fluid allowed to cool. During evacuation the diffusion pump does not start to pump until the fluid has reached its operating temperature. Time can be saved by the use of an isolating valve 18 inserted between the vacuum chamber 16 and the diffusion pump 13. Valves of the swing, butterfly, and gate type are among those that have been used.

As illustrated in FIG. 1, for a diffusion pump of speed $S_{DP}$ the effective pumping speed is reduced by the conductance of the components between the pump, or the vapor jets 10, and the vacuum chamber 16. For a system as illustrated in FIG. 1 with a baffle 17, a valve 18 and a pumping tube 11 all having respective conductances, the effective pumping speed is reduced by these intervening components.

OBJECTS AND SUMMARY OF THE INVENTION

It is therefore a primary object of the present invention to provide a vacuum system with improved effective pumping speed.

It is another object of the invention to provide a vacuum system as above which has both baffling and valve capabilities but with relatively high conductance.

In accordance with the above objects there is provided a vacuum system having a pumped chamber and means for connecting the pumped chamber to a vacuum chamber. Dual function means are located in the pumped chamber for both closing the connection in one position and serving as an optical baffle in another position to prevent backstreaming.

BRIEF DESCRIPTION OF THE DRAWINGS

FIG. 1 is a schematic representation of a prior art vacuum system with connected components which is in cross-sectional format;

FIG. 2 is a cross-sectional view of a portion of a vacuum system incorporating the improvement of the present invention.

DESCRIPTION OF THE PREFERRED EMBODIMENT

FIG. 2 illustrates a portion of the vacuum system and illustrates at 21 a dual function apparatus which serves both as a backstream baffle plate and a valve for closing the connection at the vacuum flange 22 between vacuum chamber 16 and the pumped chamber or diffusion pump 13. Specifically, baffle/valve 21 includes a circular plate 23 of high thermal conductivity such as copper. A flexible contact plate of Be—Cu is 24 affixed to plate 23. In the position illustrated contact plate 23 is deformed against the cooling coil 26 which is in the form of an open loop. An annular elastomer seal 27 is connected around baffle plate 23.

The entire structure 21 is pivoted at point 35 by means of an actuating shaft 30 of low thermal conductivity which extends to the ambient atmosphere 28 through a flexible vacuum tight coupling 29. Cooling coils 31 are provided for this coupling. The outer wall 11' also is cooled by cooling tubes 33. Bolts 32 that secure the diffusion pump to the vacuum chamber, pass through the vacuum-tight volume giving a large area between the baffle plate 21 and the outer wall 11' thus contributing to the high conductance while keeping small the overall dimensions of the interconnecting structure.

In operation the baffle valve is closed by means of rotation of the shaft 30 thus forcing the baffle plate downwards. The elastomer seal 27 seats on the machine smooth surface of the lower flange 22 thus forming a vacuum seal. With the baffle plate in the lowered position the lower flange provides some cooling while radiation from the radiation pump stack will cause a small temperature rise. When the valve is open the choice of high thermal conductivity materials such as for the baffle plate 21, the cooling coil 26, and the flexible contact plate 24 assures that the baffle plate rapidly returns to its operating temperature.

Although a diffusion pump has been illustrated the invention is also useful for sputter ion and titanium sublimation pumps.

What is claimed is:

1. A vacuum system having a pumped chamber and means for connecting said pumped chamber to a vacuum chamber said system comprising: dual function means located in said pumped chamber for both closing said connection in one position and serving as an optical backstream baffle in another position to prevent backstreaming such dual function means also being spaced a sufficient distance from the walls of the pumped chamber and said connection to provide a relatively high conductance between said pumped chamber and vacuum chamber; and means for cooling said dual function means in said baffle position, and where said dual function means includes a plate of high thermal conductivity and a flexible contact plate mounted on said high conductivity plate and where said cooling means is a fixed coil against which said contact plate is deformed in said baffle position.

2. A system as in claim 1 where said connecting means includes a flange and where said plate of high thermal conductivity has an elastomer seal for mating with said flange and is displaced in a parallel manner, relative to said walls of said pumped chamber from said closing position to said baffle position.

* * * * *